United States Patent
Kohara et al.

(10) Patent No.: US 7,392,401 B2
(45) Date of Patent: Jun. 24, 2008

(54) DATA STORAGE APPARATUS

(75) Inventors: Ryoko Kohara, Kyoto (JP); Akira Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 763 days.

(21) Appl. No.: 10/297,662

(22) PCT Filed: Mar. 8, 2002

(86) PCT No.: PCT/JP02/02169

§ 371 (c)(1),
(2), (4) Date: Dec. 9, 2002

(87) PCT Pub. No.: WO02/073872

PCT Pub. Date: Sep. 19, 2002

(65) Prior Publication Data

US 2003/0182566 A1    Sep. 25, 2003

(30) Foreign Application Priority Data

Mar. 9, 2001    (JP)    ............................. 2001-067700

(51) Int. Cl.
*G06F 11/30*    (2006.01)
(52) U.S. Cl. ..................... 713/193; 713/189; 711/163; 711/164; 327/545
(58) Field of Classification Search .................. 713/170; 380/277; 726/21
See application file for complete search history.

(56) References Cited

U.S. PATENT DOCUMENTS 5,159,629 A * 10/1992 Double et al. ................ 713/194

(Continued)

FOREIGN PATENT DOCUMENTS

JP    62-107352 A    5/1987

(Continued)

OTHER PUBLICATIONS

Japanese Decision of Final Refusal and English translation thereof mailed Aug. 30, 2005 in corresponding Japanese application No. 2001-067700.

(Continued)

*Primary Examiner*—Kambiz Zand
*Assistant Examiner*—Roderick Tolentino
(74) *Attorney, Agent, or Firm*—Nixon & Vanderhye, PC

(57) ABSTRACT

In an encryption storage apparatus (data storage apparatus) (1), when entered an allocation request signal (a1), a key management section (7) outputs a generation request signal (b) to a random number generation section (3). The random number generation section (3) generates a pseudorandom number as an encryption key (c) at the entering timing of the generation request signal (b), and the key management section (7) causes a volatile key storage section (4) to store the encryption key (c) and returns a corresponding key number (a2) to a user side. When the user enters an encryption instructing signal (a3) and the key number (a2) to the key management section (7), the key management section (7) reads out the corresponding encryption key (c), and an encryption section (5) converts entered data (d1) into encrypted data (d2) and stores the encrypted data (d2) in a nonvolatile storage section (2). When the user enters decryption instructing signal (a4) and the key number (a2) to the key management section (7), the key management section (7) reads out the corresponding encryption key (c) and a decryption section (6) converts the encrypted data (d2) to decrypted data (d3). This can prevent non-interested persons from recognizing stored data in a nonvolatile storage apparatus in chain manner.

22 Claims, 15 Drawing Sheets

U.S. PATENT DOCUMENTS

| | | | |
|---|---|---|---|
| 5,717,756 A * | 2/1998 | Coleman | 713/155 |
| 5,883,958 A * | 3/1999 | Ishiguro et al. | 705/57 |
| 5,987,376 A * | 11/1999 | Olson et al. | 701/201 |
| 5,987,572 A | 11/1999 | Weider et al. | |
| 6,105,131 A * | 8/2000 | Carroll | 713/155 |
| 6,148,401 A * | 11/2000 | Devanbu et al. | 713/170 |
| 6,249,866 B1 * | 6/2001 | Brundrett et al. | 713/165 |
| 6,772,340 B1 * | 8/2004 | Peinado et al. | 713/168 |
| 6,990,578 B1 * | 1/2006 | O'Brien et al. | 713/156 |
| 2002/0114453 A1 * | 8/2002 | Bartholet et al. | 380/44 |

FOREIGN PATENT DOCUMENTS

| | | |
|---|---|---|
| JP | 5-22283 | 1/1993 |
| JP | 9-218836 | 8/1997 |
| JP | 9-223061 A | 8/1997 |
| JP | 9-258977 | 10/1997 |
| JP | 10-134157 | 5/1998 |
| JP | 10-134157 A | 5/1998 |
| JP | 10-293724 A | 11/1998 |
| JP | 11-73375 | 3/1999 |
| JP | 2000-92040 | 3/2000 |
| JP | 2000-295209 | 10/2000 |
| JP | 2000-299682 A | 10/2000 |

OTHER PUBLICATIONS

Joint authors of Simson Garfinkel and Gene Spafford, translated under the supervision of Akira Yamaguchi; "UNIX Security", Ascii Corp., Tokyo-To, Jan. 1, 1993, ISBN 4-7561-0274-3, pp. 79 and 80.

EP Search Report, dated Jun. 25, 2007.

* cited by examiner

FIG. 3

| KEY NO. | ENCRYPTION KEY | IN-USE FLAG |
|---|---|---|
| 0 | ................ | 1 |
| 1 | ................ | 0 |
| 2 | ................ | 1 |
|  | ................ | ..... |
|  | ................ | ..... |
| N | ................ | 0 |

FIG. 6

| | KEY NO. | ENCRYPTION KEY | IN-USE FLAG |
|---|---|---|---|
| 0 | ................ | ................ | 1 |
| 1 | ................ | ................ | 0 |
| 2 | ................ | ................ | 1 |
| | ................ | ................ | ..... |
| | ................ | ................ | ..... |
| N | ................ | ................ | 0 |

FIG. 12

| KEY NO. | ENCRYPTION KEY | STARTING DATE AND TIME OF USE |
|---|---|---|
| 0 | ················ | 200012150820 |
| 1 | ················ | 0 |
| 2 | ················ | 200012141557 |
| ················ | ················ | ····· |
| ················ | ················ | ····· |
| N | ················ | 0 | a nonvolatile storage medium which does not need to be read out any more, without decrease in efficiency of data input and output.

DATA STORAGE APPARATUS

TECHNICAL FIELDS

The present invention relates to a data storage apparatus for storing data.

BACKGROUND OF THE INVENTION

Various data storage apparatuses for storing secret data in a nonvolatile storage medium have been proposed.

For example, in order to restrict the reading of the data stored, Japanese Unexamined Patent Publication No. 107352/1987 (Tokukaisho 62-107352; published on May 18, 1987) discloses an "encryption ROM device" which includes a ROM for storing data, and a volatile memory or a volatile register into which an encryption key is written. In the case when data is stored in the encryption ROM device, the encryption key is written into the volatile memory or the volatile register, and data is encrypted with the encryption key to store in the ROM. Meanwhile, in the case when data is read out from the encryption ROM device, the encryption key is written into the volatile memory or the volatile register, and data in the ROM is decrypted with the enciyplion key. The encryption key written into the volatile memory or the volatile register is easily erased by turning off the power of the encryption ROM device, and it is arranged so that data stored in the ROM cannot be read out only by turning on the power again.

Moreover, as to the secret data which is not needed any more, Japanese Unexamined Patent Publication No. 223061/1997 (Tokukaihei 9-223061; published on Aug. 26, 1997) discloses "information processing device" in which upon completion of the reading of the secret data, not only an index including FAT which manages data storage locations but also secret data are erased from the information storage area, such as a hard disk storing secret data, for enhancement of confidentiality.

However, in the "encryption ROM device" of Japanese Unexamined Patent Publication No. 107352/1987, there is the possibility that when the content of the ROM storing easily analyzable data is analyzed by the outsider who has smuggled it out, the encryption key that has been erased might be guessed. There is the danger that when the encryption key was known by non-interested persons, they might sequentially decrypt the data stored in the encryption ROM device. This threatens not only other data stored in the analyzed ROM, but also data that will be stored in the encryption ROM device in the future.

Moreover, in case of the "information processing device" of Japanese Unexamined Patent Publication No. 223061/1997, secret data itself, in addition to the index, is erased, so that the data to be erased has a large volume. Consequently, the time required for erasing increases, which might result in the decrease in efficiency of data input and output with respect to the information storage area.

DISCLOSURE OF THE INVENTION

An object of the present invention is to provide a data storage apparatus which can prevent the non-interested persons from recognizing stored data in a nonvolatile storage medium in chain manner.

Further, another object of the present invention is to provide a data storage apparatus which can make it difficult for non-interested persons to read out stored data in a nonvolatile storage medium which does not need to be read out any more, without decrease in efficiency of data input and output.

In order to solve the foregoing problems, a data storage apparatus of the present invention (encryption storage apparatus) including a nonvolatile storage section for storing data, comprises: (a) a random number generation section for generating a pseudorandom number at a predetermined timing, the pseudorandom number at the timing being regarded as an encryption key; (b) a key storage section, which is volatile, for storing the encryption key that has been generated by the random number generation section; (c) an encryption section for, when the encryption key is provided, encrypting entered data with the encryption key, and for causing the nonvolatile storage section to store the entered data as encrypted data; (d) a decryption section for, when an encryption key identical with the encryption key used at a time of encryption is provided, decrypting and reading out the encrypted data stored in the nonvolatile storage section with the encryption key; and (e) key management section for, in response to a request for allocation of the encryption key to a user, which is made from outside, returning encryption key information corresponding to a latest encryption key at a time of the request for allocation, for reading out the encryption key corresponding to the encryption key information from the key storage section and providing the encryption key to the encryption section when an instruction to encrypt the entered data and the encryption key information are entered, and for reading out the encryption key corresponding to the encryption key information from the key storage section and providing to the decryption section when an instruction to read out the encrypted data and the encryption key information are entered.

With the foregoing arrangement, the random number generation section generates the pseudorandom number at the predetermined timing and regards the pseudorandom number at the timing as the encryption key, and the key storage section stores this encryption key. Then, the key management section returns the encryption key information corresponding to the latest encryption key to the user when the user makes the request for allocation of the encryption key from outside. When the instruction of data encryption and the encryption key information are entered by the user, the key management section reads out the encryption key corresponding to the encryption key information from the key storage section and provides the encryption key that has been read out to the encryption section. The encryption section encrypts the entered data with the encryption key that has been provided and causes the nonvolatile storage section, i.e. the nonvolatile storage medium to store the entered data as encrypted data.

Further, when the instruction to read out encrypted data and the encryption key information are entered by the user, the key management section reads out the encryption key corresponding to the encryption key information from the key storage section and provides it to the decryption section. When the encryption key identical with the encryption key used at the time of encryption is provided, the decryption section decrypts with the encryption key to read out the encrypted data stored in the nonvolatile storage section.

Thus, generated plural encryption keys make a very low probability of occurrence of an identical encryption key because the pseudorandom number is used for the encryption key c. Consequently, allocation of the generated latest encryption key to the user can differ the plural encryption keys allocated at the different generation timings of the pseudorandom numbers at a high probability. This allows data encryption and decryption to be easily carried out by various encryption keys, and it is possible to store plural kinds of encrypted data, each of which has a different encryption key, in the nonvolatile storage section.

Further, in case when data is analyzed due to smuggling of data, the encryption key stored in the key storage section is erased by shut-off of an interruptible power source because the key storage section volatilizes stored data. In this state, even if the encryption key of easily analyzable encrypted data which accidentally exists is guessed when the encrypted data stored in the nonvolatile storage section is analyzed, decryption cannot be made with the encryption key thus guessed with respect to encrypted data that has been encrypted by other different encryption key. Still further, even if the encryption key is guessed on the encrypted data in the nonvolatile storage section that has been smuggled out, a pseudorandom number is used for an encryption key of encrypted data that will be stored in the nonvolatile storage section in the future, so that there is a high probability that the encryption key thus guessed is different from an actual encryption key. Therefore, the encrypted data is hardly recognized in chain manner by a person other than the user of the encrypted data.

As a result of this, it is possible to provide a data storage apparatus which can prevent the non-interested persons from recognizing stored data in a nonvolatile storage medium in chain manner.

Further, in case when the encrypted data does not need to be read out any more for such a reason that the user has decrypted the encrypted data stored in the nonvolatile storage section, it is difficult for the non-interested persons to guess the encryption key, as described above, as far as data is not easily analyzable. Hence, a time-consuming operation that would disturb data input and output is not needed, such as deletion of the encrypted data stored in the nonvolatile storage section. As a result of this, it is possible to provide a data storage apparatus which can make it difficult for non-interested persons to read out the stored data in a nonvolatile storage medium, which does not need to be read out any more, without decrease in efficiency of data input and output.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 3 is an explanatory view for explaining a structural example of allocation frames used in the data storage apparatus of FIG. 1.

FIG. 6 is an explanatory view for explaining another structural example of allocation frames used in the data storage apparatus of FIG. 1.

FIG. 12 is an explanatory view for explaining another structural example of allocation frames used in the data storage apparatus of FIG. 8.

BEST MODE FOR CARRYING OUT THE INVENTION

[Embodiment 1]

The following will explain one embodiment embodying a data storage apparatus of the present invention with reference to FIGS. 1 through 7.

Figure 1:
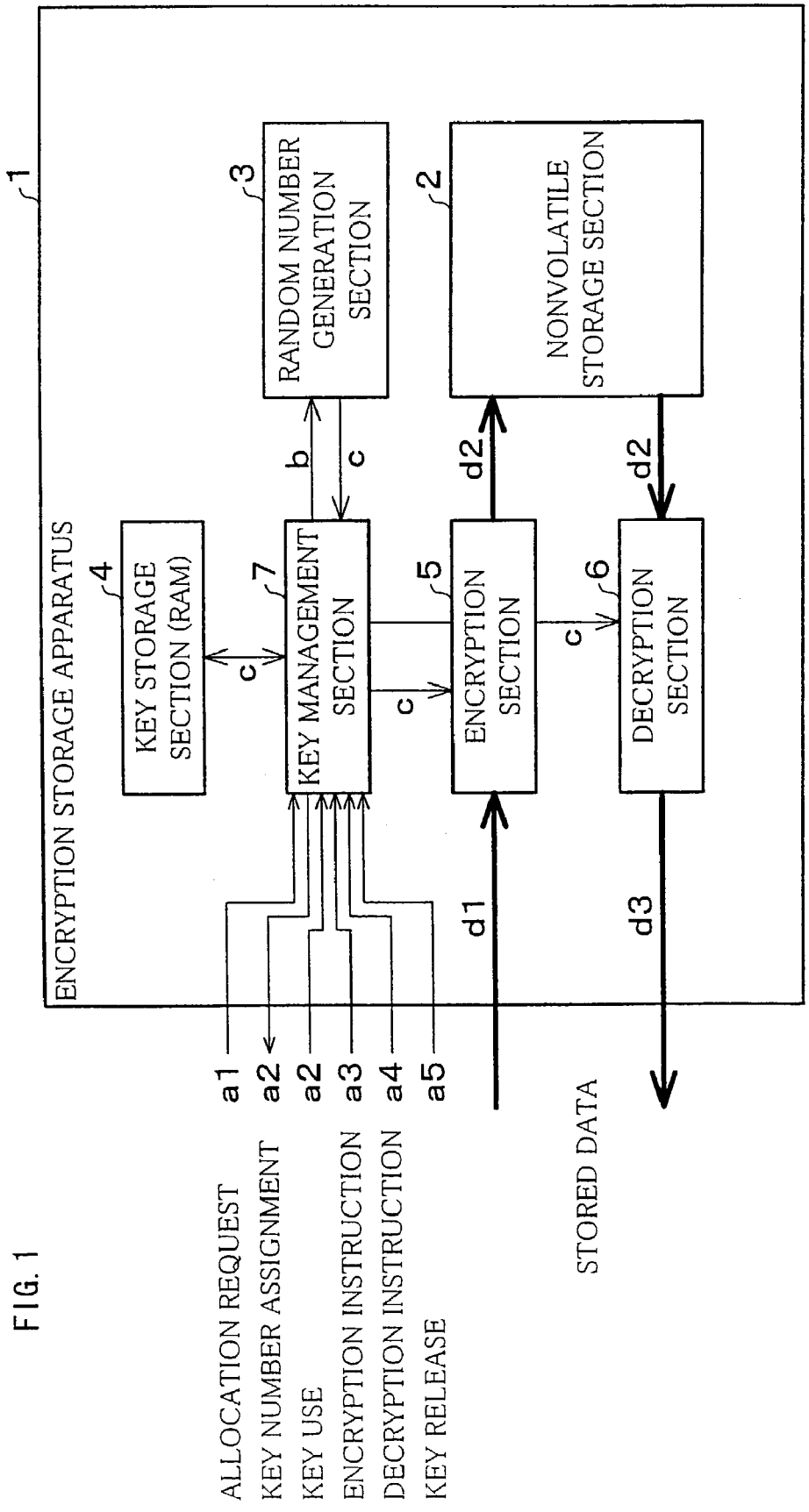
FIG. 1 is a block diagram showing an arrangement of a data storage apparatus according to one embodiment of the present invention.

FIG. 1 shows an arrangement of an encryption storage apparatus 1 as the data storage apparatus according to the present embodiment. The encryption storage apparatus 1 includes a nonvolatile storage section 2, a random number generation section 3, a key storage section 4, an encryption section 5, a decryption section 6, and a key management section 7.

The nonvolatile storage section (nonvolatile storing means) 2 is a storage medium not volatilizing stored data, such as a hard disk and an ROM. The nonvolatile storage section 2 stores encrypted data, which is data that has been encrypted. The random number generation section (encryption key generating means) 3 generates a pseudorandom number at a predetermined timing, and each pseudorandom number generated at the timing is regarded as an encryption key c. Here, the random number generation section 3 receives a request for generation of the encryption key c from the key management section 7 described later, and when the random number generation section 3 receives the request for generation from the key management section 7 is regarded as the predetermined timing. The key storage section (encryption key storing means) 4 is a storage medium volatilizing stored data, such as an RAM. The key storage section 4 stores the encryption key c that has been generated in the random number generation section 3, under the management by the key management section 7.

When the encryption key c is provided from the key management section 7, the encryption section (encrypting means) 5 encrypts data d1 entered from outside the encryption storage apparatus 1 with the provided encryption key c and causes the nonvolatile storage section 2 to store it as an encrypted data d2. When an encryption key c identical with the encryption key at the time of encryption is provided from the key management section 7, the decryption section (decrypting means) 6 reads out the encrypted data d2 stored in the nonvolatile storage section 2, decrypts it with the provided encryption key c, and outputs obtained decrypted data d3 to outside the encryption storage apparatus 1.

Figure 2:
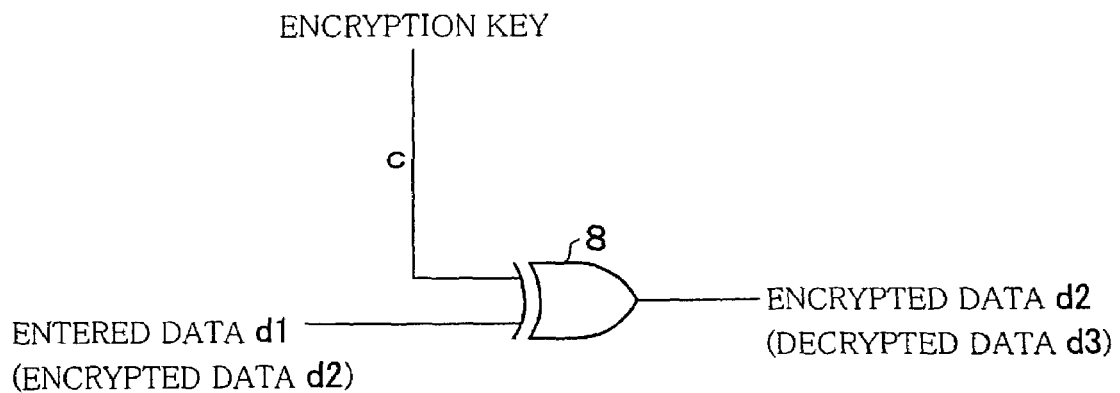
FIG. 2(a) and FIG. 2(b) are circuit block diagrams showing arrangements of an encryption section and a decryption section in the data storage apparatus of FIG. 1.
Figure 2:
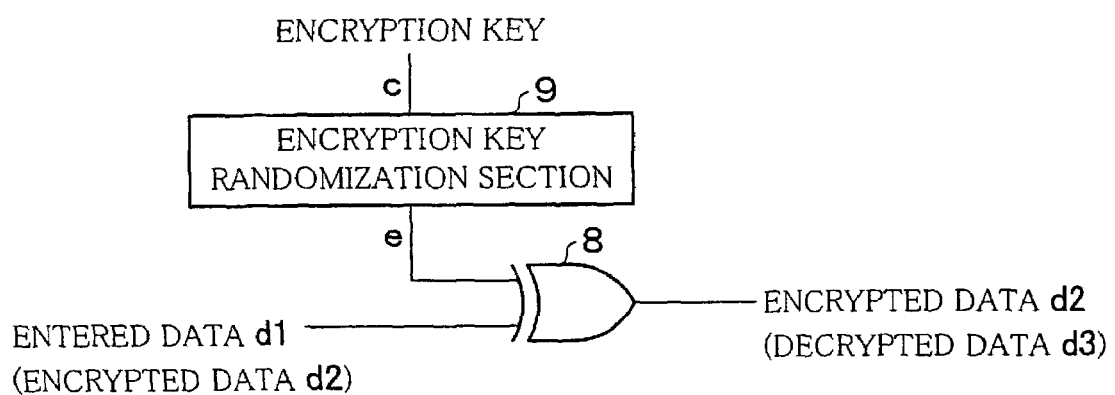

FIGS. 2(*a*) and 2(*b*) shows arrangement examples of the encryption section 5 and the decryption section 6. FIG. 2(*a*) shows the arrangement of the encryption section 5 in which an EX-OR gate 8 performs an exclusive OR operation using the encryption key c and the data d1 entered from outside the encryption storage apparatus 1 to generate the encrypted data d2, and the arrangement of the decryption section 6 in which the EX-OR gate 8 performs an exclusive OR operation using the encryption key c and the encrypted data d2 in the nonvolatile storage section 2 to generate the decrypted data d3. FIG. 2(*b*), which is the addition of an encryption key randomization section 9 for generating a pseudorandom number e, by making the encryption key c as a trigger, and for inputting the pseudorandom number e to the EX-OR gate 8 to the arrangement of FIG. 2(*a*), shows the arrangement of the encryption section 5 in which the EX-OR gate 8 performs an exclusive OR operation using the pseudorandom number e and the data d1 to generate the encrypted data d2, and the arrangement of the decryption section 6 in which the EX-OR gate 8 performs an exclusive OR operation using the pseudorandom number e and the encrypted data d2 to generate the decrypted data d3. The encryption key randomization section 9 always outputs the same pseudorandom number e when inputted the same encryption key c. In the arrangement in FIG. 2(*b*), even a simple sequence of numeric values is randomized into a complex sequence of numeric values so that the encryption key c cannot be easily guessed by the analysis of the encrypted data d2.

The key management section (encryption key managing means) 7 manages the generation, delivery, and selection of the encryption key c. The key management section 7 is arranged so that an allocation request signal al indicating a request for allocation of the encryption key c is entered thereto via a computer by the user of the encryption storage apparatus 1 from outside the encryption storage apparatus 1. When the allocation request signal a1 is entered, the key management section 7 outputs a generation request signal b indicating a request for generation of the encryption key c to the random number generation section 3. The key management section 7 causes the key storage section 4 to store the encryption key c generated by the random number generation section 3, and returns to the user side (computer) a key number (encryption key information) a2 corresponding to the encryption key c that has been just generated, i.e. a latest encryption key c. The key storage section 4 stores some encryption keys c generated in the past by the random number generation section 3, and the key number a2 differs for each encryption key c.

Further, the key management section 7 is arranged so that an encryption instructing signal a3 indicating an instruction of encrypting and a decryption instructing signal a4 indicating an instruction of decrypting are inputted thereto. When attempting to encrypt the data d1 and store it in the nonvolatile storage section 2, the user enters the encryption instructing signal a3 and the key number a2 via the computer to the key management section 7. In accordance with this entering, the key management section 7 reads out the encryption key c corresponding to the key number a2 from the key storage section 4 and provides it to the encryption section 5. Further, when attempting to decrypt the encrypted data d2 in the nonvolatile storage section 2 and read out the decrypted data d3, the user enters the decryption instructing signal a4 and the key number a2 via the computer to the key management section 7. In accordance with this entering, the key management section 7 reads out the encryption key c corresponding to the key number a2 from the key storage section 4 and provides it to the decryption section 6. Also, the key management section 7 is arranged so that a key release signal a5 indicating an instruction to invalidate the allocated encryption key c is entered thereto by the user. The key management section 7 is arranged so that when a proper key number a2 corresponding to the encryption key c is entered thereto in addition to the key release signal a5, it does not provide the encryption key c to the encryption section 5 and the decryption section 6 in the future, even if the same key number a2 is entered thereto.

Figure 3:
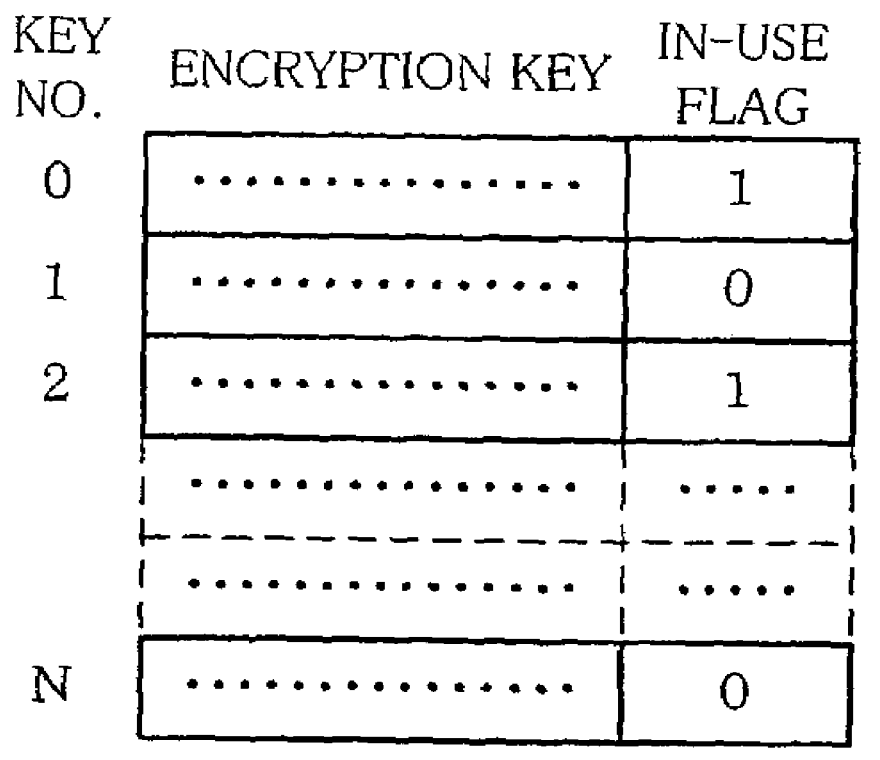

Moreover, the key management section 7 recognizes allocation frames indicating the content of the allocation of the encryption keys c to the user, and causes key storage section 4 to store it. FIG. 3 shows one structural example of the allocation frames. The allocation frames are provided so as to correspond to N+1, plural key numbers a2 ranging from 0 to N, and one encryption key c corresponds to each allocation frame. Note that, one allocation frame is also possible to provide. Further, the encryption keys c are arranged to be stored in the key storage section 4, providing up to N+1, which is the total number of the allocation frames. The key management section 7 switches flags to in-use flags "1" for the allocation frames of the encryption keys c that have been already allocated to the users and are presently valid. Further, the key management section 7 switches flags to "0" indicating allocation frames not in use, for the allocation frames of the encryption keys c that have been already allocated to the users, but are presently invalid and for the allocation frames of the encryption keys c that have not been allocated yet to the users. Moreover, when invalidating the encryption keys c of the allocation frames switched to in-use flags "1" in accordance with the foregoing key release signal a5, the key management section 7 switches to change the flag of the allocation frame to "0".

Figure 4:
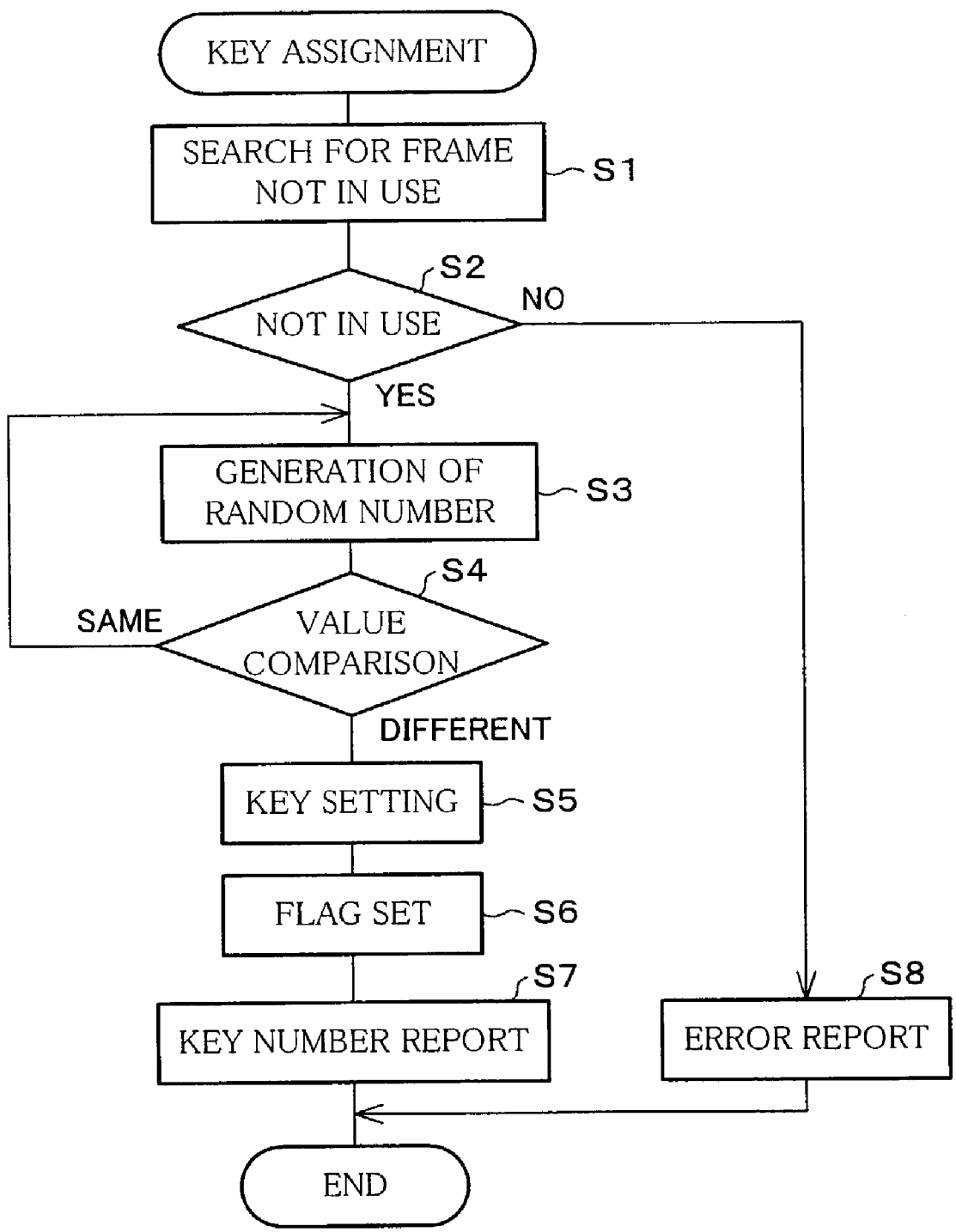
FIG. 4 is a flow chart showing the steps for the procedure of key assignment in the case where the allocation frames of FIG. 3 are used.

Referring to the flow chart in FIG. 4, the following will explain the steps of the procedure for allocation of the encryption keys c (referred to as "key assignment") in the state where the allocation frames in FIG. 3 are provided. When the allocation request signal a1 is entered to the key management section 7, the key management section 7 searches allocation frame not in use at the step S1. At the step S2, in case when the allocation frame not in use exist, the procedure goes to the step S3. In case when the allocation frames not in use do not exist, the procedure goes to the step S8 to return an error report to the user side (computer), and the procedure is completed. At the step S3 the key management section 7 outputs the generation request signal b to the random number generation section 3 to cause the random number generation section 3 to generate the encryption key c.

Next, at the step S4, the key management section 7 compares between the value of a pseudorandom number as the latest encryption key c generated by the random number generation section 3 and the values of pseudorandom numbers as encryption keys c that have been already stored in the key storage section 4. At this moment, the invalid encryption keys c are also a target for comparison. The procedure goes to the step S5 in case where no encryption key c identical with the latest encryption key c exists in the encryption keys c that have been already stored in the key storage section 4, or the procedure goes back to the step S3 in case where an encryption key identical with the latest encryption key c exists, to cause the random number generation section 3 to regenerate the encryption key c. Thus, the key management section 7 causes the random number generation section 3 to regenerate the encryption key c until no encryption key identical with the latest encryption key c exists in the encryption keys c that have been already stored in the key storage section 4. The identical latest encryption key c is not stored in the key storage section 4 and automatically excluded from being allocated to the users.

At the step S5, the key management section 7 sets the latest encryption key c and causes the key storage section 4 to store it. Then, at the step S6, the latest encryption key c is made to be an encryption key c of any allocation frame not in use, and the flag of the selected allocation frame is switched from "0" to "1". At the step S7, the key number a2 corresponding to the encryption key c is returned to the user, and the procedure is completed. The above steps are the procedure for key assignment.

Figure 5:
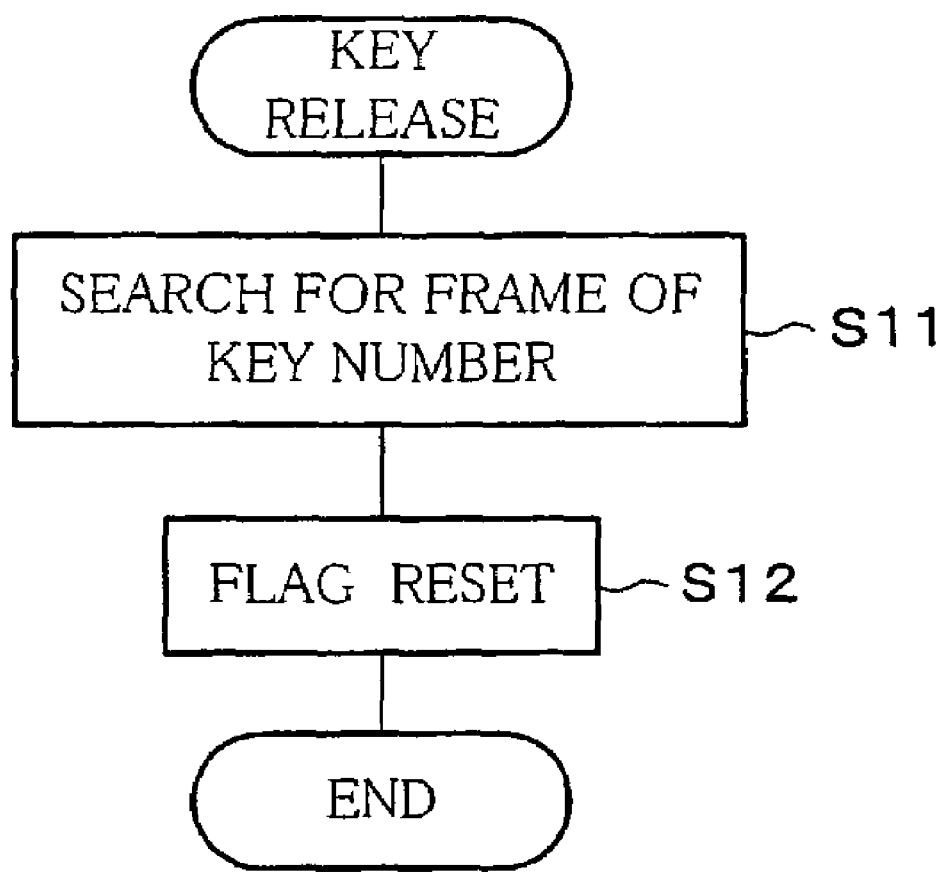
FIG. 5 is a flow chart showing the steps for the procedure of key release in the case where the allocation frames of FIG. 3 are used.

Next, referring to the flow chart in FIG. 5, the following will explain the steps of the procedure for invalidation of the encryption keys c (referred to as "key release") in the state where the allocation frames in FIG. 3 are provided. First, when the key release signal a5 and a proper key number a2 corresponding to an encryption key c to be released are entered to the key management section 7, the key management section 7 searches the allocation frame of the foregoing key number a2 at the step S11. Then, at the step S12 the key management section 7 switches (resets) the flag of the searched allocation frame from "1" to "0". The above steps are the procedure for key release.

Thus, according to the encryption storage apparatus 1 of the present embodiment, generated plural encryption keys c make a very low probability of occurrence of an identical encryption key c because the pseudorandom number is used for the encryption key c. Consequently, allocation of the generated latest encryption key c to the user can differ the plural encryption keys c allocated at the different generation timings of the pseudorandom numbers at a high probability. This allows data encryption and decryption to be easily carried out by various encryption keys c, and it is possible to store plural kinds of encrypted data d2, each of which has a different encryption key c, in the nonvolatile storage section 2.

Especially in the encryption storage apparatus 1, in case where an identical encryption key exists as a result of comparison between the latest encryption key c generated by the random number generation section 3 and the encryption key c (or encryption keys c) that has been already stored in the key storage section 4, the key management section 7 is arranged so as to cause the random number generation section 3 to regenerate the latest encryption key c until no identical encryption key exists, so that the identical encryption key c is not allocated to the user. Consequently, the latest encryption key c, which is different from the encryption key c (or encryption keys c) that has been already stored in the key storage section 4, is allocated to the user, so that, as in the case where the key management section 7 outputs the generation request signal b to cause the random number generation section 3 to generate a new encryption key c in response to the allocation request signal a1 entered, it is possible to surely differ the encryption keys c from one another by allocating to the user the plural encryption keys c generated at the different generation timings of the pseudorandom numbers.

Further, in case when data in the encryption storage apparatus 1 is analyzed due to smuggling of the encryption storage apparatus 1, the encryption key c (or encryption keys c) stored in the key storage section 4 is erased by shut-off of an interruptible power source because the key storage section 4 volatilizes stored data. In this state, even if the encryption key c of easily analyzable encrypted data d2 which accidentally exists is guessed when the encrypted data d2 stored in the nonvolatile storage section 2 is analyzed, decryption cannot be made with the encryption key c thus guessed with respect to the encrypted data d2 that has been encrypted by other different encryption key c. Still further, even if the encryption key c is guessed on the encrypted data d2 in the nonvolatile storage section 2 that has been smuggled out, a pseudorandom number is used for an encryption key c of encrypted data d2 that will be stored in the nonvolatile storage section 2 in the future, so that there is a high probability that the encryption key thus guessed is different from an actual encryption key. Therefore, the encrypted data d2 is hardly recognized in chain manner by a person other than the user of the encrypted data d2.

As a result of this, the encryption storage apparatus 1 is a data storage apparatus which can prevent the non-interested persons from recognizing stored data in a nonvolatile storage medium in chain manner.

Further, in case when the encrypted data d2 does not needed to be read out any more for such a reason that the user has decrypted the encrypted data d2 stored in the nonvolatile storage section 2, it is difficult for the non-interested persons to guess the encryption key c, as described above, as far as data is not easily analyzable. Hence, a time-consuming operation that would disturb data input and output is not needed, such as deletion of the encrypted data d2 stored in the nonvolatile storage section 2. As a result of this, the encryption storage apparatus 1 is a data storage apparatus which can make it difficult for non-interested persons to read the stored data in a nonvolatile storage medium which does not need to be read out any more, without decrease in efficiency of data input and output.

Still further, according to the encryption storage apparatus 1, the random number generation section 3 receives from the key management section 7 the generation request signal b that reflects the request for generation of the encryption key c from outside, and generates the encryption key c, regarding when the random number generation section 3 receives the request for generation from the key management section 7 as the predetermined timing. Thus, the random number generation section 3 is caused to generate the encryption key c when the generation of the encryption key c is required, so that it is possible to easily obtain the encryption key c which is different from the encryption key c (or encryption keys c) that has been already generated, which is stored in the key storage section 4. Moreover, it is possible to prevent the generation of useless, wasteful encryption keys c.

Yet further, according to the encryption storage apparatus 1, in response to the allocation request signal a1 entered, the key management section 7 outputs the generation request signal b to the random number generation section 3 for the aforementioned request for the generation. Thus, the random number generation section 3 is caused to generate the encryption key c at the time of the request for allocation of the encryption key c, so that it is possible to easily obtain the encryption key c which is different by each request for allocation. Therefore, it is possible to make it difficult for other users to recognize data, and to prevent data excluded from the reading target by the same user from being read out. Moreover, an additional request for generation of the encryption key c is not necessary.

Yet further, according to the encryption storage apparatus 1, plural encryption keys c are stored in the key storage section 4. Therefore, the encryption keys c can be used for the encryption and decryption of different kinds of data, respectively, so that it is possible to allocate different encryption keys c to different users in the same period and to allocate to the same user mutually different encryption keys c for the processing of different kinds of data. This can increase the number of times the nonvolatile storage section 2 is usable in the same period in the state where confidentiality is secured for each of data, thereby improving the efficiency in data encryption and decryption.

Further, the encryption storage apparatus 1 is arranged such that the key management section 7 receives a combination of the instruction to invalidate the encryption key c from outside, such as the key release signal a5, and the key number a2 corresponding to the encryption key c, so that the encryption key c cannot be given to the encryption section 5 and the decryption section 6 even if the key number a2 is entered. Therefore, the encryption key c can be set not to be used for the data encryption and decryption whenever the user does not need to use the encryption key c any more, so that a probability that data is read out improperly can be minimized.

Figure 6:
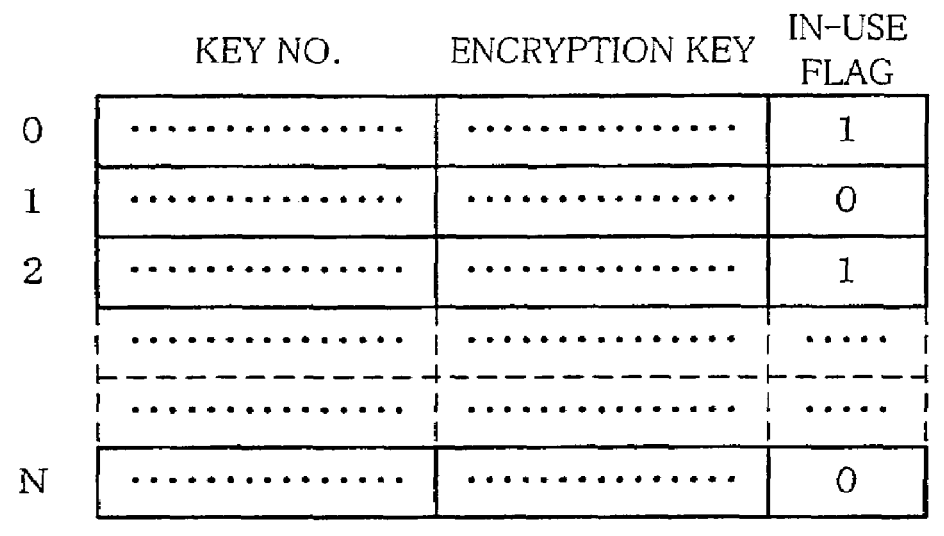

Still further, in the encryption storage apparatus 1, the key number a2 allocated to the user may be a pseudorandom number. For example, in the encryption storage apparatus 1, the random number generation section 3 may serve as encryption key information generating means for generating a pseudorandom number as a key number a2. FIG. 6 shows one structural example of allocation frames in case where the key number a2 is a pseudorandom number. Since the key number a2 is the pseudorandom number, the allocation frames themselves are given the numbers from 0 to N. With such an arrangement, the key number a2 is provided to the user in the form of the pseudorandom number, so that it is possible to prevent improper data encryption and decryption using the key number a2 given in the past in accordance with the speculation that the key number a2 given in the past could be valid even today.

Figure 7:
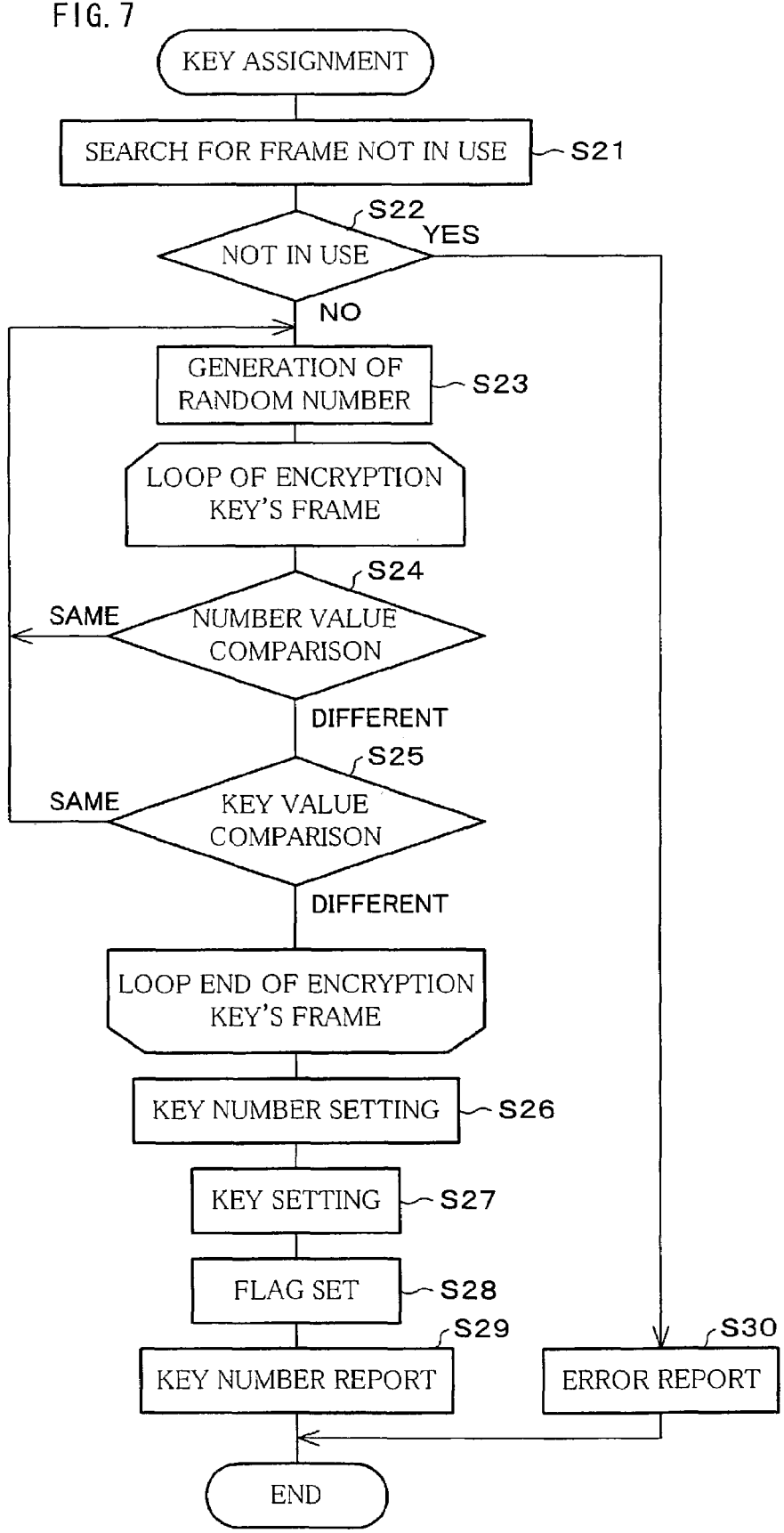
FIG. 7 is a flow chart showing the steps for the procedure of key assignment in the case where the allocation frames of FIG. 6 are used.

Referring to the flow chart in FIG. 7, the following will explain the steps of the procedure for allocation of the encryption key c (referred to as "key assignment") in the case where the key number a2 is the pseudorandom number. First, when the allocation request signal a1 is entered to the key management section 7, the key management section 7 searches allocation frame not in use at the step S21. At the step S22, in case when the allocation frames not in use exist, the procedure goes to the step S23. In case when no allocation frames not in use exist, the procedure goes to the step S30 to return an error report to the user side (computer), and the procedure is completed. At the step S23, the key management section 7 outputs the generation request signal b to the random number generation section 3 to cause the random number generation section 3 to generate the pseudorandom number for the key number a2 and the pseudorandom number for the encryption key c.

Next, the procedure goes to "loop of encryption key's frame". At the step S24, the key management section 7 compares between the value of the pseudorandom number as the key number a2 generated by the random number generation section 3 and the value of the pseudorandom number as the key number a2 (or key numbers a2) that has been already stored in the key storage section 4 or the storing means for the key number a2 (not shown). In case where it is undesired to erase comparative targets by shut-off of the power source of the encryption storage apparatus 1, a nonvolatile storage medium as storing means for the key number a2 may be provided somewhere. Then, in case where no key number identical with the key number a2 that has just generated exists in the key number a2 (or key numbers a2) that have been already stored, the procedure goes to the step S25. In case where the identical key number a2 exists, the procedure goes back to the step S23 to cause the random number generation section 3 to regenerate the key number a2. At the step S25, the key management section 7 compares between the latest encryption key c generated by the random number generation section 3 and the encryption key c (or encryption keys c) that has been already stored in the key storage section 4. In case where no encryption key identical with the latest encryption key c exists in the encryption key c (or encryption keys c) that has been already stored in the key storage section 4, the procedure goes to the step S26, completing "loop of encryption key's frame". In case where the encryption key identical with the latest encryption key c exists, the procedure goes back to the step S23 to cause the random number generation section 3 to regenerate the encryption key c. At this moment, the invalid encryption key c is also a target for comparison. The key management section 7 does not store the identical latest encryption key c in the key storage section 4 and automatically excludes it from being allocated to the user.

At the step S26 the key management section 7 sets the key number a2 and makes it stored, and at the step S27 the key management section 7 sets the latest encryption key c and makes it stored in the key storage section 4. Then, at the step S28 the key management section 7 gives the key number a2 and the latest encryption key c as the key number a2 and the latest encryption key c for any allocation frame not in use, and the flag of the selected allocation frame is switched from "0" to "1". At the step S29, the key management section 7 returns the set key number a2 to the user, and the procedure is completed. The above steps are the procedure for key assignment.

[Embodiment 2]

The following will explain another embodiment embodying the data storage apparatus of the present invention with reference to FIGS. 8 through 15. Note that, members having the same functions as those described in the Embodiment 1 are given the same reference numerals and explanations thereof are omitted here.

Figure 8:
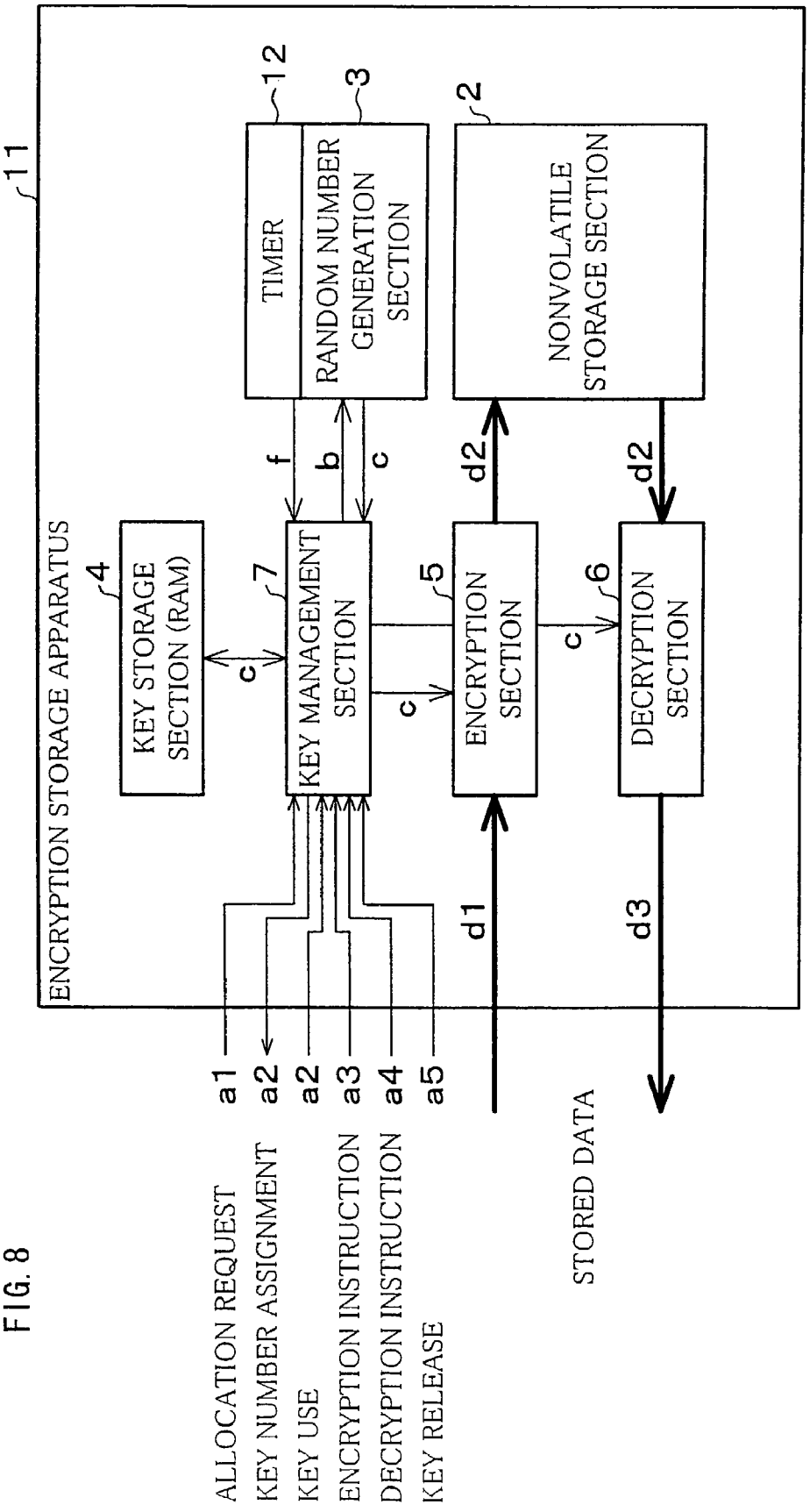
FIG. 8 is a block diagram showing an arrangement of a data storage apparatus according to another embodiment of the present invention.

FIG. 8 shows an arrangement of an encryption storage apparatus 11 as a data storage apparatus according to the present embodiment. The encryption storage apparatus 11 has an arrangement in which a timer 12 is added to the encryption storage apparatus 1 as described in Embodiment 1. The timer 12 generates a signal f at a certain time interval and inputs it to the key management section 7. When the signal f is inputted, the key management section 7 inputs a generation request signal b to the random number generation section 3, and the random number generation section 3 generates an encryption key c in accordance with an input timing of the generation request signal b as the predetermined timing. More specifically, the predetermined timing of the random number generation section 3 works with the generation timing of the signal f by the timer 12.

Figure 9:
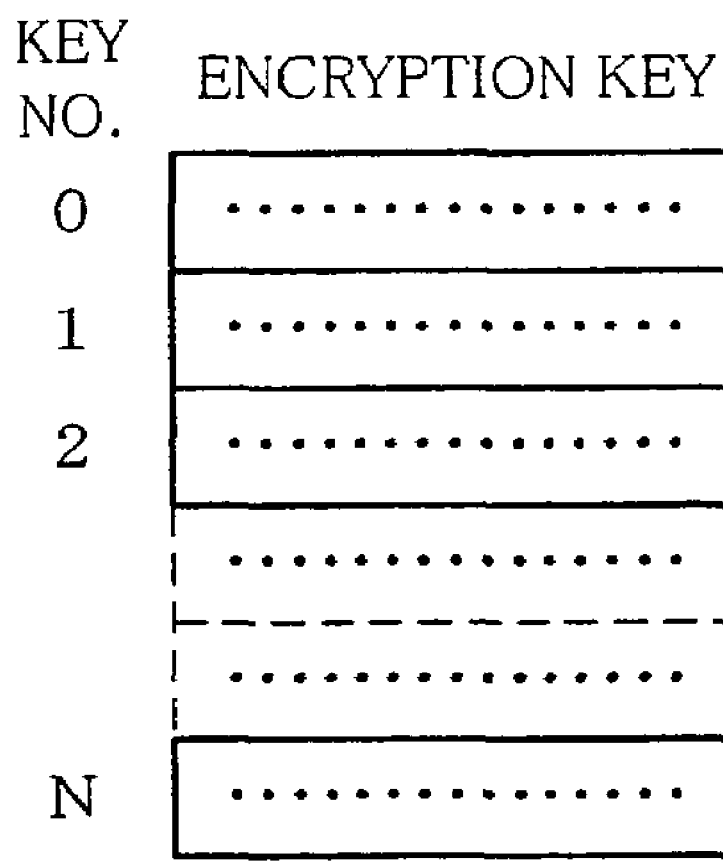
FIG. 9 is an explanatory view for explaining a structural example of allocation frames used in the data storage apparatus of FIG. 8.
Figure 10:
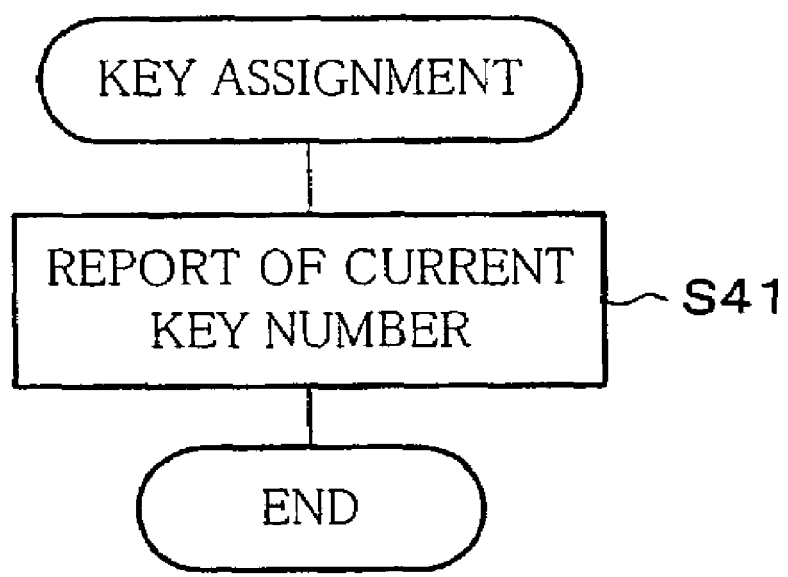
FIG. 10 is a flow chart showing the steps for the procedure of key assignment in the case where the allocation frames of FIG. 9 are used.

FIG. 9 shows one structural example of allocation frames in such an arrangement including the timer 12. A key number a2 ranges in number from 0 to N, the allocation frame is also the same in number as the key number a2, and one encryption key c corresponds to each key number a2. The key management section 7 applies the encryption keys c to the respectively different allocation frames in order each time the signals f are generated by the timer 12. When the signal f is generated by the timer 12, the same encryption key c remains the latest encryption key c until the next signal f is generated, and the key management section 7 recognizes the key number a2 corresponding to the latest encryption key c as a current key number a2. Referring to a flow chart in FIG. 10, the following will explain allocation of encryption key c (referred to as "key assignment"). When an allocation request signal a1 is entered from a user side (computer) to the key management section 7, the key management section 7 returns (reports) the current key number a2 to the user side (computer) at the step S41. The key management section 7, after allocating the encryption keys c to all of the allocation frames by orderly updating the respective current key numbers a2, continuously changes the allocation frame of the current key number a2 at a certain time interval in such a manner that the key management section 7 updates the already allocated encryption key c to the latest encryption key c.

Figure 11:
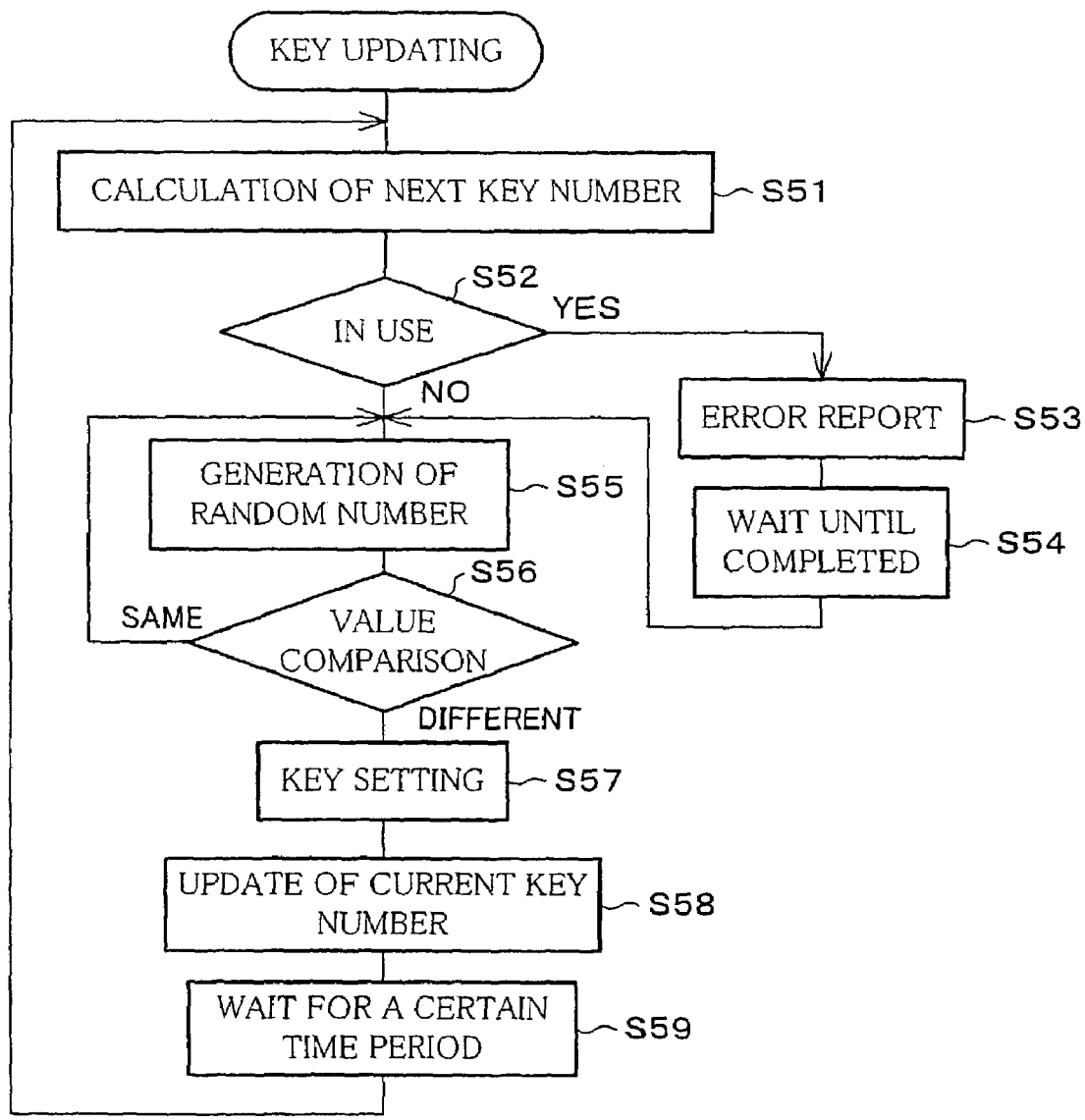
FIG. 11 is a flow chart showing the steps for the procedure of key updating in the case where the allocation frames of FIG. 9 are used.

Referring to a flow chart in FIG. 11, the following will explain the steps of the procedure for setting of the current key number a2 (referred to as "key updating") in case where the allocation frames in FIG. 9 is used. First, when the signal f is inputted from the timer 12 to the key management section 7, the key management section 7 calculates a next current key number a2 at the step S51. At the step S52, the key management section 7 judges whether the calculated key number a2 is used for encryption or decryption at the moment. In case where the key number a2 is not used for encryption or decryption, the procedure goes to the step S55. In case where the key number a2 is used for encryption or decryption, the procedure goes to the step S53 to return an error report to the user side (computer), and after a wait at the step S54 until the key number a2 in use completes to be used, the procedure goes to the step S55. At the step S55, the key management section 7 inputs the generation request signal b to the random number generation section 3 to cause the random number generation section 3 to generate the encryption key c.

At the step S56, the key management section 7 compares between the value of the pseudorandom number as the latest encryption key c generated by the random number generation section 3 and the value of the pseudorandom number as the encryption key c (or encryption keys c) that has been already stored in the key storage section 4. In case where no encryption key identical with the latest encryption key c exists in the encryption keys c (or encryption keys c) that have been already stored in the key storage section 4, the procedure goes to the step S57. In case where the encryption key identical with the latest encryption key c exists, the procedure goes back to the step S55 to cause the random number generation section 3 to regenerate the encryption key c. Then, the key management section 7 sets the latest encryption key c and causes the key storage section 4 to store it at the step S57, updates the current key number a2 at the step S58, and waits for a certain time period, i.e. until the next signal f is inputted from the timer 12. When the next signal f is inputted, the procedure goes back to the step S51. The above steps are the procedure for the key updating.

The aforementioned encryption storage apparatus 11 can cause the random number generation section 3 to generate the encryption keys c one after another by itself, so that it is not necessary for the user side to intentionally create the opportunity for the generation of the encryption key c.

Note that, the encryption storage apparatus 11 can be arranged so that after a lapse of a predetermined time period from the allocation of the encryption key c to the user, the encryption key c corresponding to the key number a2 is not provided to the encryption section 5 and the decryption section 6 even if the key number a2 is inputted. This makes the encryption key c unusable after a lapse of a predetermined time period from allocation, so that it is possible to prevent the same encryption key c from being possessed by the user for a long time. Moreover, the encryption key c can become unusable without the user providing the instruction to make the encryption key c unusable, so that a probability that encrypted data d2 is read out improperly from the nonvolatile storage section 2 can be minimized.

Making the encryption key c unusable in such a manner can be realized, for example, by that a clock, which is provided in the encryption storage apparatus 11, records the date and time when the key number a2 is assigned (when the encryption key c is allocated), and the key management section 7 invalidate the encryption key c corresponding to the relevant allocation frame after a lapse of a predetermined time period from the date and time of recording. Note that, such an arrangement is applicable to the encryption, storage apparatus 1 described in Embodiment 1 and an encryption storage apparatus 21 described later.

FIG. 12 shows one structural example of allocation frames arranged to include the foregoing clock. The date and time (year and month, if necessary) when the encryption key c is allocated, in combination with the encryption key c, is stored as information indicating the starting date and time of the use of the key number a2, in each of the allocation frames of the key numbers a2 ranging from 0 to N. The key management section 7 switches (resets) a flag to "0" for the allocation frame of the key number a2 passing a predetermined time period from the starting date and time of its use, in addition to erasing the information on the starting date and time of its use.

Figure 13:
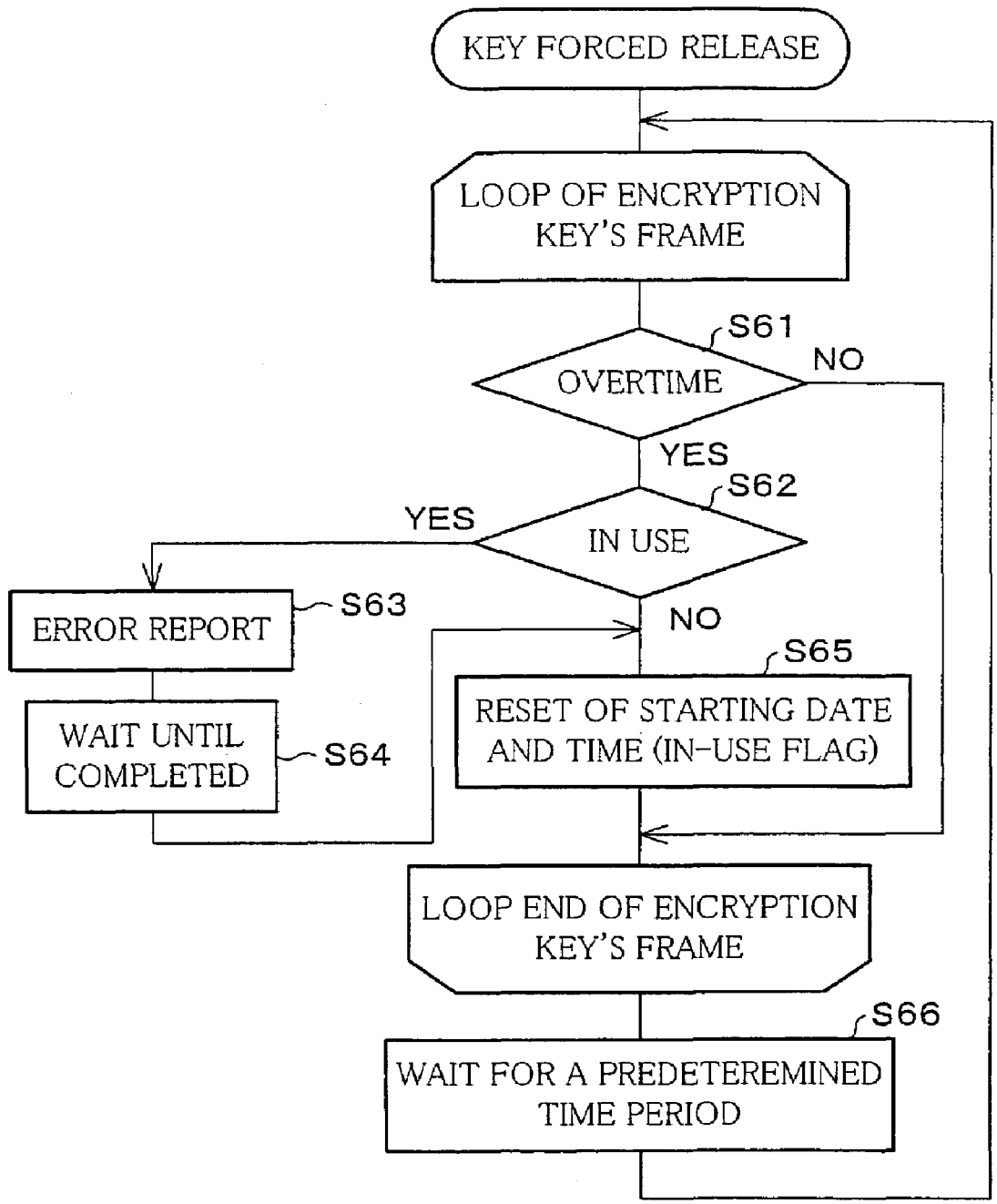
FIG. 13 is a flow chart showing the steps for the procedure of key forced release in the case where the allocation frames of FIG. 12 are used.

The flow chart in FIG. 13 shows the steps of the procedure for invalidation of the encryption key c (referred to as "key forced release") in case where the allocation frames in FIG. 12 is used. The procedure begins with "loop of encryption key's frame", and at the step S61 the key management section 7 judges whether the predetermined time period has passed since the assignment of the key number a2 (allocation of the encryption key c). If passed, the procedure goes to the step S62, or if not, the procedure goes to the step S66 completing the "loop of encryption key's frame". At the step S62, the key management section 7 judges whether the key number a2 (encryption key c) that has passed the predetermined time period is used for encryption or decryption at the moment. If not used for encryption or decryption, the procedure goes to the step S65. On the other hand, if used for encryption or decryption, an error report is returned to the user side (computer) at the step S63, and after a wait at the step S64 until the key number a2 (encryption key c) in use completes to be used, the procedure goes to the step S65. At the step S65, the key management section 7 switches (resets) a flag to "0" for the information on the starting date and time of the use of the allocation frame corresponding to the key number a2. Now, the "loop of encryption key's frame" is completed, and after a wait at the step S66 until the predetermined time period passes, the procedure goes back to the step S61. The above steps are the procedure for key forced release.

Figure 14:
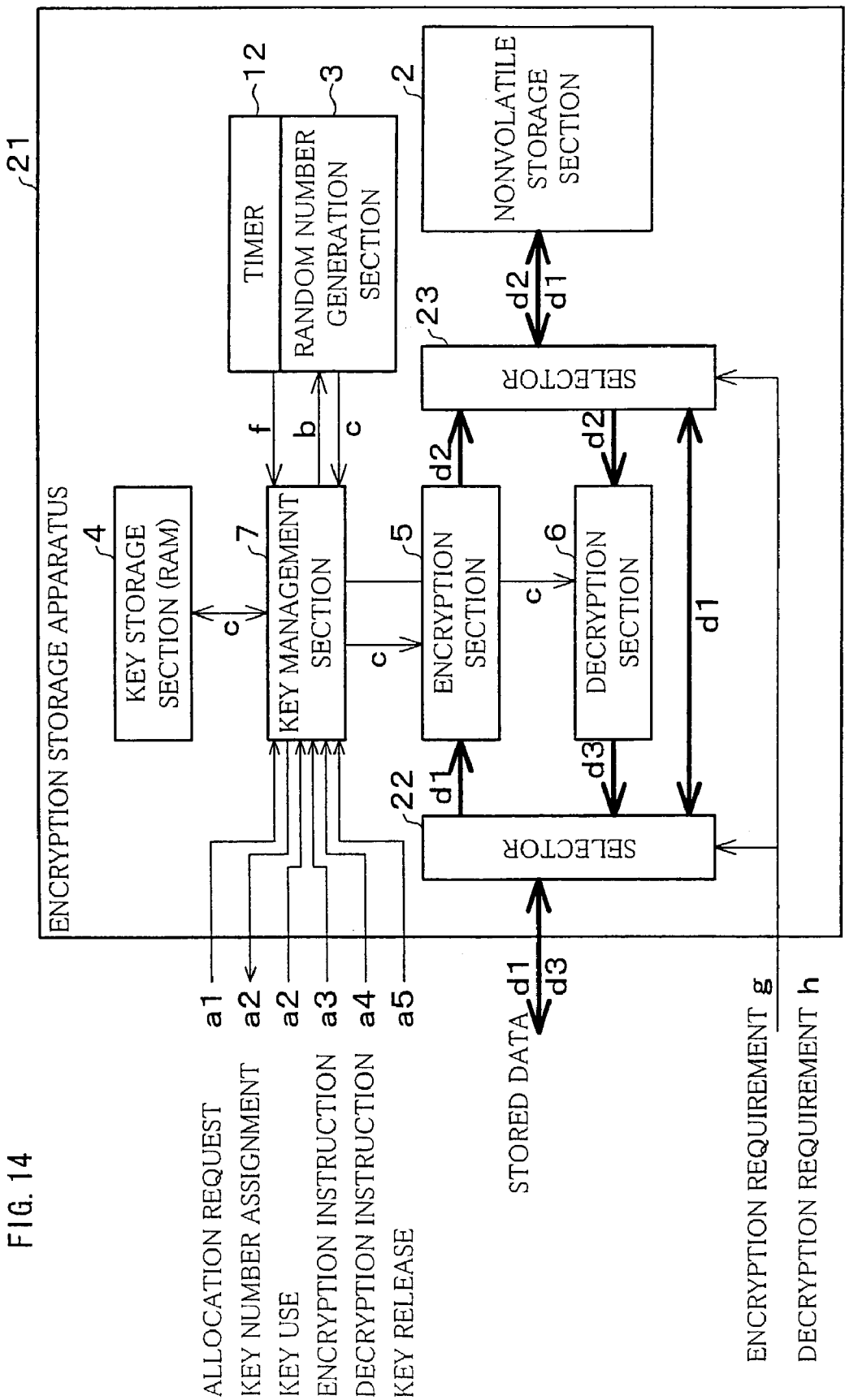
FIG. 14 is a block diagram showing an arrangement of a modification of a data storage apparatus according to another embodiment of the present invention.

Next, FIG. 14 shows an arrangement of an encryption storage apparatus (data storage apparatus) 21 as a modification of the encryption storage apparatus 11. The encryption storage apparatus 21 has an arrangement in which selectors 22 and 23 are added to the encryption storage apparatus 11. The selector 22 is provided between an entering side of data d1, and an encryption section 5 and a decryption section 6 in the encryption storage apparatus 21. The selector 23 is provided between the encryption section 5 and the decryption section 6, and a nonvolatile storage section 2. To the selectors 22 and 23 entered are an encryption requirement signal g indicating whether encryption is required or not and a decryption requirement signal h indicating whether decryption is required or not, from the user side (computer).

In encrypting the data d1, the encryption requirement signal g indicating that encryption is required is entered to the selectors 22 and 23. The selector 22 switches its channel so that the data d1 entered to the encryption storage apparatus 21 is inputted to the encryption section 5, and the selector 23 switches its channel so that encrypted data d2 outputted from the encryption section 5 so as to be inputted to the nonvolatile storage section 2. In decrypting the encrypted data d2, the decryption requirement signal h indicating that decryption is required is entered to the selectors 22 and 23. The selector 23 switches its channel so that the encrypted data d2 outputted from the nonvolatile storage section 2 is inputted to the decryption section 6, and the selector 22 switches its channel so that decrypted data d3 outputted from the decryption section 6 is outputted from the encryption storage apparatus 21 to the user side (computer).

Further, as to data d1 that does not need to be encrypted, in storing it in the nonvolatile storage section 2, the encryption requirement signal g indicating that the encryption is not required is entered to the selectors 22 and 23. The selectors 22 and 23 switch the respective channels so that the data d1 is passed from the selector 22 directly to the selector 23 and inputted to the nonvolatile storage section 2. Still further, in reading out the data d1 that has not been encrypted from the nonvolatile storage section 2, the decryption requirement signal h indicating that the decryption is not required is entered to the selectors 22 and 23. The selectors 22 and 23 switch the respective channels so that the data d1 are passed from the selector 23 directly to the selector 22 and outputted from the encryption storage apparatus 21 to the user side (computer).

Figure 15:
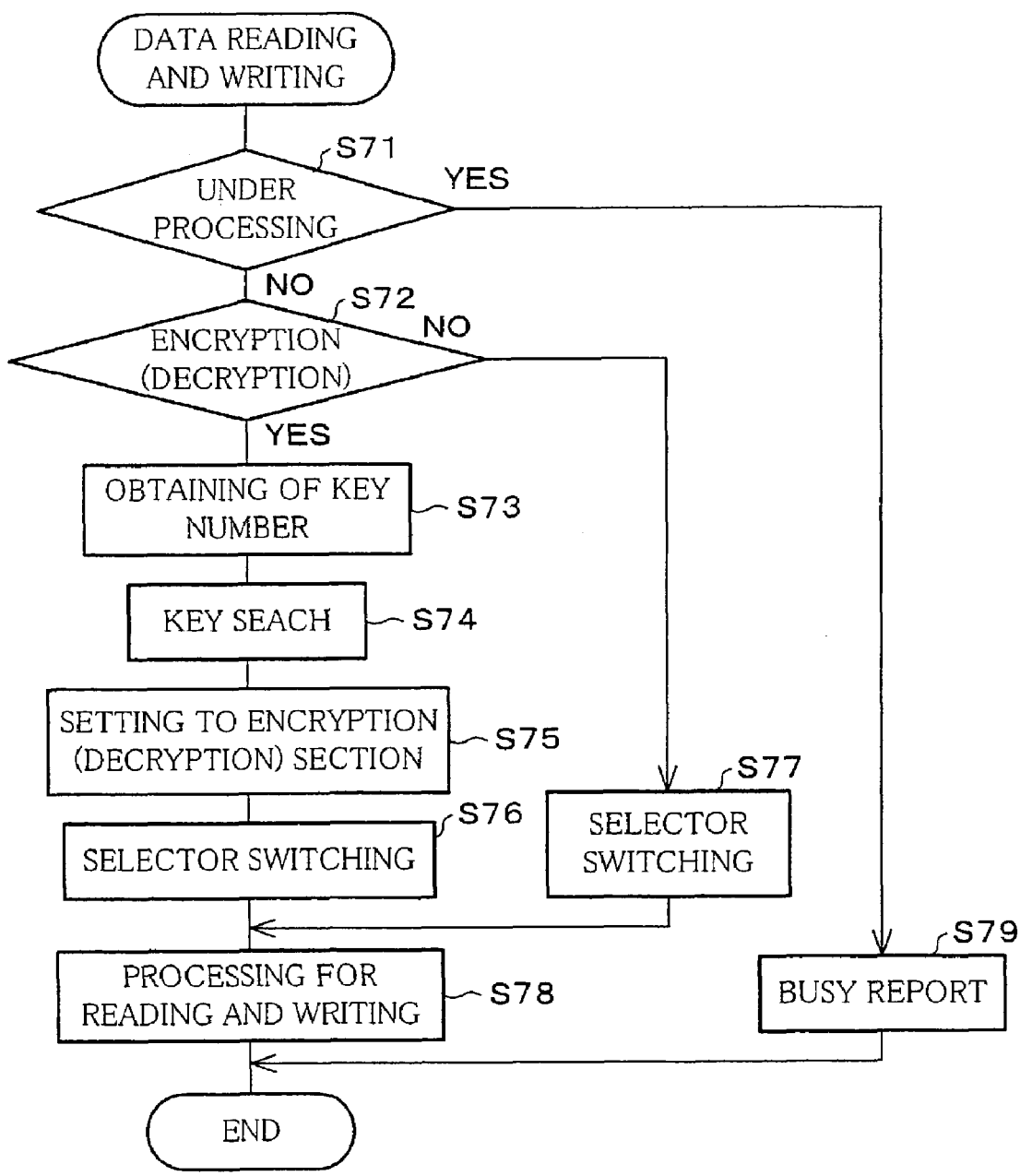
FIG. 15 is a flow chart showing the steps for the procedure of data reading and writing in the case where the data storage apparatus of FIG. 14 is used.

Referring to a flow chart in FIG. 15, the following will explain the steps of the procedure for data reading and writing by using the encryption storage apparatus 21. First, at the step S71, the key management section 7 judges whether or not data reading and writing is under processing. If not under processing, the procedure goes to the step S72. On the other hand, if under processing, the procedure goes to the step S79 to return a busy report to the user, and the procedure is completed. At the step S72, the key management section 7 judges whether or not data encryption or decryption is performed. If data encryption or decryption is performed, the procedure goes to the step S73. On the other hand, if data encryption or decryption is not performed, the procedure goes to the step S77. At the step S77, the encryption requirement signal g indicating that the encryption is not required or the decryption requirement signal h indicating that the decryption is not required are entered to the selectors 22 and 23, channels are switched so that the selectors 22 and 23 are connected directly with each other, and the procedure goes to the step S78.

At the step S73 the key management section 7 receives the key number a2 from the user side (computer), and at the step S74 the key management section 7 searches and reads out the corresponding encryption key c from the key storage section 4. At the step S75 the key management section 7 provides (sets) the encryption key c to the encryption section 5 or the decryption section 6. At the step S76 the encryption requirement signal g indicating that the encryption is required or the decryption requirement signal h indicating that the decryption is required are entered to the selectors 22 and 23 to cause the selectors 22 and 23 to switch to the channels for encryption and decryption. Then, at the step S78 data reading and writing is performed, and the procedure is completed.

Thus, according to the encryption storage apparatus 21, the selectors 22 and 23 are provided, so that data that do not need encryption and decryption can be also stored in the nonvolatile storage section 2.

A data storage apparatus of the present invention including a nonvolatile storing means for storing data, comprises: (a) encryption key generating means for generating a pseudorandom number at a predetermined timing, the pseudorandom number at the timing being regarded as an encryption key; (b) encryption key storing means, which is volatile, for storing the encryption key that has been generated by the encryption key generating means; (c) encrypting means for, when the encryption key is provided, encrypting entered data with the encryption key, and for causing the nonvolatile storing means to store the entered data as encrypted data; (d) decrypting means for, when an encryption key identical with the encryption key used at a time of encryption is provided, decrypting and reading out the encrypted data stored in the nonvolatile storing means with the encryption key; and (e) encryption key managing means for, in response to a request for allocation of the encryption key to a user, which is made from outside, returning encryption key information corresponding to an latest encryption key at a time of the request for allocation, for reading out the encryption key corresponding to the encryption key information from the encryption key storing means and providing the encryption key to the encrypting means when an instruction to encrypt the entered data and the encryption key information are entered, and for reading out the encryption key corresponding to the encryption key information from the encryption key storing means and providing to the decrypting means when an instruction to read out the encrypted data and the encryption key information are entered.

With the foregoing arrangement, the encryption key generating means generate the pseudorandom number at the predetermined timing and regard the pseudorandom number at the timing as the encryption key, and the encryption key storing means store this encryption key. Then, the encryption key managing means return the encryption key information corresponding to the latest encryption key to the user when the user makes the request for allocation of the encryption key from outside. When the instruction of data encryption and the encryption key information are entered by the user, encryption key managing means read out the encryption key corresponding to the encryption key information from the encryption key storing means and provide the encryption key that has been read out to the encrypting means. The encrypting means encrypt the entered data with the encryption key that has been provided and causes the nonvolatile storing means, i.e. the nonvolatile storage medium to store the entered data as encrypted data.

Further, when the instruction to read out encrypted data and the encryption key information are entered by the user, the encryption key managing means read out the encryption key corresponding to the encryption key information from the encryption key storing means and provide it to the decrypting means. When the encryption key identical with the encryption key used at the time of encryption is provided, the decrypting means decrypt with the encryption key to read out the encrypted data stored in the nonvolatile storing means.

Thus, generated plural encryption keys make a very low probability of occurrence of an identical encryption key because the pseudorandom number is used for the encryption key c. Consequently, allocation of the generated latest encryption key to the user can differ the plural encryption keys allocated at the different generation timings of the pseudorandom numbers at a high probability. This allows data encryption and decryption to be easily carried out by various encryption keys, and it is possible to store plural kinds of encrypted data, each of which has a different encryption key, in the nonvolatile storage section.

Further, in case when data is analyzed due to smuggling of data, the encryption key stored in the encryption key storing means is erased by shut-off of an interruptible power source because the encryption key storing means volatilize stored data. In this state, even if the encryption key of easily analyzable encrypted data which accidentally exists is guessed when the encrypted data stored in the nonvolatile storing means is analyzed, decryption cannot be made with the encryption key thus guessed with respect to encrypted data that has been encrypted by other different encryption key. Still further, even if the encryption key is guessed on the encrypted data in the nonvolatile storing means that have been smuggled out, a pseudorandom number is used for an encryption key of encrypted data that will be stored in the nonvolatile storing means in the future, so that there is a high probability that the encryption key thus guessed is different from an actual encryption key. Therefore, the encrypted data is hardly recognized in chain manner by a person other than the user of the encrypted data.

As a result of this, it is possible to provide a data storage apparatus which can prevent the non-interested persons from recognizing stored data in a nonvolatile storage medium in chain manner.

Further, in case when the encrypted data does not need to be read out any more for such a reason that the user has decrypted the encrypted data stored in the nonvolatile storing means, it is difficult for the non-interested persons to guess the encryption key, as described above, as far as data is not easily analyzable. Hence, a time-consuming operation that would disturb data input and output is not needed, such as deletion of the encrypted data stored in the nonvolatile storing means. As a result of this, it is possible to provide a data storage apparatus which can make it difficult for non-interested persons to read out the stored data in a nonvolatile storage medium, which does not need to be read out any more, without decrease in efficiency of data input and output.

Further, the data storage apparatus may have an arrangement in which the encryption key generating means receive a request for generation of the encryption key from outside and generates the encryption key, regarding a time of the request for generation as the predetermined timing.

With the foregoing arrangement, the encryption key generating means are caused to generate the encryption key when the generation of the encryption key is required, so that it is possible to easily obtain the encryption key which is different from the encryption key that has been already generated, which is stored in the encryption key storing means. Moreover, it is possible to prevent the generation of useless, wasteful encryption keys.

Still further, the data storage apparatus may have an arrangement in which the encryption key managing means make the request for generation to the encryption key generating means at the time of the request for allocation.

With the foregoing arrangement, the encryption key generating means are caused to generate the encryption key at the time of the request for allocation of the encryption key, so that it is possible to easily obtain the encryption key which is different by each request for allocation. Therefore, it is possible to make it difficult for other users to recognize data, and to prevent data excluded from the reading target by the same user from being read out. Moreover, an additional request for generation of the encryption key is not necessary.

Yet further, the data storage apparatus may have an arrangement in which a timer for generating a signal at a certain time interval, and the predetermined timing of the encryption key generating means work with a generation timing of the signal.

With the foregoing arrangement, the encryption key generating means are caused to generate the encryption keys one after another by itself, so that it is not necessary to intentionally create the opportunity for the generation of the encryption key.

Further, the data storage apparatus may have an arrangement in which the encryption key storing means store a plurality of the encryption keys.

With the foregoing arrangement, the encryption keys can be used for the encryption and decryption of different kinds of data, respectively, so that it is possible to allocate different encryption keys to different users in the same period and to allocate to the same user mutually different encryption keys for the processing of different kinds of data. This can increase the number of times the nonvolatile storing means are usable in the same period in the state where confidentiality is secured for each of data, thereby improving the efficiency in data encryption and decryption.

Still further, the data storage apparatus has an arrangement in which the encryption key managing means, in case where an identical encryption key exists as a result of comparison between the latest encryption key generated by the encryption key generating means and the encryption keys that have been already stored in the encryption key storing means, causes the encryption key generating means to regenerate the latest encryption key until no identical encryption key exists, and the identical encryption key is not allocated to a user.

With the foregoing arrangement, the latest encryption key, which is different from the encryption key that has been already stored in the encryption key storing means, is allocated to the user, so that it is possible to surely differ plural encryption keys allocated at the different generation timings of the pseudorandom numbers.

Yet further, the data storage apparatus may have an arrangement in which the encryption key managing means receive a combination of an instruction to invalidate the encrypted key and the encryption key information corresponding to the encryption key from outside so that the encryption key is not provided to both the encrypting means and the decrypting means even if the encryption key is entered.

With the foregoing arrangement, the encryption key can be set not to be used for the data encryption and decryption whenever the encryption key does not need to be used any more, so that a probability that data is read out improperly can be minimized.

Further, the data storage apparatus may have an arrangement in which the encryption key managing means, after a lapse of a predetermined time period from allocation of the encryption key to a user, provide the encryption key to neither the encrypting means nor the decrypting means even if the encryption key information is entered.

With the foregoing arrangement, the encryption key becomes unusable after a lapse of a predetermined time period from allocation, so that it is possible to prevent the same encryption key from being possessed by the user for a long time. Moreover, the encryption key can become unusable without the user providing the instruction to make the encryption key unusable, so that a probability that encrypted data is read out improperly can be minimized.

Still further, the data storage apparatus may be arranged so as to include encryption key information generating means for generating the pseudorandom number as the encryption key information.

With the foregoing arrangement, the encryption key information is provided to the user in the form of the pseudorandom number, so that it is possible to prevent improper data encryption and decryption, using the encryption key information given in the past.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICATION OF THE PRESENT INVENTION

As described above, a data storage apparatus according to the present invention is useful as a data storage apparatus which stores secret data in a nonvolatile storage medium; especially, it is applicable to a data storage apparatus which requires an excellent confidentiality as well as a function of making the stored content impossible to be read out in a short time.

What is claimed is:

1. A data storage apparatus comprising a nonvolatile storing section for storing data,
the data storage apparatus further comprising:
(a) an encryption key generating section for generating a pseudorandom number at a predetermined timing, the pseudorandom number being regarded as an encryption key;
(b) an encryption key storing section, which is volatile;
(c) an encryption section for, when the encryption key is provided, encrypting entered data with the encryption key, and for causing the nonvolatile storing section to store the encrypted data;
(d) a decrypting section for, when an encryption key identical with the encryption key used at a time of encryption is provided, decrypting and reading out the encrypted data stored in the nonvolatile storing section with the encryption key; and
(e) an encryption key managing section for:
in response to an encryption key allocation request, which is supplied from outside the data storage apparatus, providing an encryption key generation request to the encryption key generating section,
returning to the outside encryption key information decided by the encryption key managing section and which corresponds to the encryption key generated in response to the encryption key generation request, without returning to the outside the generated encryption key itself,
reading out the encryption key corresponding to the encryption key information from the encryption key storing section and providing the encryption key to the encrypting section when an instruction to encrypt the entered data and the encryption key information are supplied to the encryption key managing section, and
reading out the encryption key corresponding to the encryption key information from the encryption key storing section and providing the encryption key to the decrypting section when an instruction to read out the encrypted data and the encryption key information are supplied to the encryption key managing section,
wherein the encryption key information corresponding to the encryption key is not the encryption key itself and the encryption key information is different for different encryption keys.

2. The data storage apparatus according to claim 1, further comprising a timer for generating a signal at a certain time interval and for sending the signal to the encryption key generating section, wherein the encryption key generating section generates an encryption key when receiving the signal.

3. The data storage apparatus according to claim 1, wherein the encryption key storing section stores a plurality of encryption keys.

4. The data storage apparatus according to claim 1, wherein the encryption key managing section, in a case in which an identical encryption key exists as a result of comparison between a latest encryption key generated by the encryption key generating section and encryption keys already stored in the encryption key storing section, causes the encryption key generating section to regenerate the latest encryption key until no identical encryption key exists, and the identical encryption key is not allocated to a user.

5. The data storage apparatus according to claim 1, wherein the encryption key managing section receives a combination of an instruction to invalidate the encrypted key and the encryption key information corresponding to the encryption key from the outside so that the encryption key is not provided to either of the encrypting section and the decrypting section even if the encryption key information is entered.

6. The data storage apparatus according to claim 1, wherein the encryption key managing section, after a lapse of a predetermined time period from allocation of the encryption key to a user, provides the encryption key to neither the encrypting section nor the decrypting section even if the encryption key information is entered.

7. The data storage apparatus according to claim 1, further comprising an encryption key information generating section for generating a pseudorandom number as the encryption key information.

8. The data storage apparatus according to claim 1, wherein:
the encryption key storing section stores the encryption key, the encryption key information corresponding to the encryption key, and an in-use flag indicating whether or not the encryption key is currently in use, the encryption key, the encryption key information, and the in-use flag being stored so as to be correlated with one another, and
when the encryption key managing section receives an instruction for invalidating the encryption key information and the encryption key, the encryption key managing section causes the in-use flag, which corresponds to the encryption key information, to indicate that the encryption key is not currently in use.

9. The data storage apparatus according to claim 1, wherein:
the encryption key storing section stores the encryption key, the encryption key information corresponding to the encryption key, and an in-use flag indicating whether or not the encryption key is currently in use, the encryption key, the encryption key information, and the in-use flag being stored so as to be correlated with one another, and
after a certain time has passed since the allocation of the encryption key, the encryption key managing section causes the in-use flag, which corresponds to the encryption key information, to indicate that the encryption key is not currently in use.

10. A key managing section for a data storage system comprising an encryption key generating section, a volatile encryption key storing section, an encryption section and a decryption section,
the key managing section responding to receiving an encryption key allocation request from outside the data storage system by outputting an encryption key generation request signal to the encryption key generating section and supplying to the outside encryption key information decided by the key managing section and which corresponds to the encryption key generated in response to the encryption key generation request, without supplying to the outside the encryption key itself, the encryption key information and the corresponding encryption key being stored in the volatile encryption key storing section, the key managing section responding to an encryption instruction and the encryption key information corresponding to the stored encryption key by using the encryption key information to read out from the volatile encryption key storing section the encryption key, and providing the read-out encryption key to the encryption section, and the key managing section responding to a decryption instruction and the encryption key information corresponding to the stored encryption key by using the encryption key information to read out from the volatile encryption key storing section the encryption key, and providing the read-out encryption key to the decryption section, wherein the encryption key information corresponding to the encryption key is not the encryption key itself and the encryption key information is different for different encryption keys.

11. A data storage apparatus comprising:

a nonvolatile storing section for storing data;

an encryption key generating section;

a volatile encrytion key storing section;

an encryption section for, when an encryption key is provided, encrypting entered data with the provided encryption key, and for causing the nonvolatile storing section to store the encrypted data; and an encryption key managing section for, in response to receiving an encryption key allocation request, which is supplied from outside the data storage apparatus, providing an encryption key generation request to the encryption key generating section and returning to the outside encryption key information decided by the encryption key managing section and which corresponds to the encryption key generated in response to the encryption key generation request, without returning to the outside the generated encryption key itself, the encryption information and the corresponding encryption key being stored in the volatile encryption key storing section, wherein, in response to receiving an encryption instruction and the encryption key information corresponding to the stored encryption key, and without receiving the encryption key itself, the encryption key managing section uses the encryption key information to read out from the volatile encryption key storing section the encryption key, and provides the read-out encryption key to the encryption section.

12. A data storage apparatus comprising:

a nonvolatile storing section for storing data;

an encryption key generating section;

a volatile encryption key storing section;

a decryption section for, when an encryption key is provided, decrypting data stored in the nonvolatile storing section; and an encryption key managing section for, in response to receiving an encryption key allocation request, which is supplied from outside the data storage apparatus, providing an encryption key generation request to the encryption key generating section and returning to the outside encryption key information decided by the encryption key managing section and which corresponds to the encrytion key generated in response to the encryption key generation request, without returning to the outside the generated encryption key itself, the encryption information and the corresponding encryption key being stored in the volatile encryption key storing section, wherein, in response to receiving a decryption instruction and the encryption key information corresponding to the stored encryption key, and without receiving the encryption key itself, the encryption key managing section uses the encryption key information to read out from the volatile encryption key storing section the encryption key, and provides the read-out encryption key to the decryption section.

13. A data storage apparatus comprising:

a nonvolatile storage device;

an encryption key generator for generating encryption keys;

a volatile encryption key storing device for storing the encryption keys, wherein the volatile encryption key storing device further stores, for each encryption key, encryption key information that corresponds to, but is different from, the encryption key;

an encryptor for, when one of the encryption keys is provided, encrypting data with that encryption key, and for supplying the encrypted data to the nonvolatile storage device;

a decryptor for, when an encryption key identical with the encryption key used at a time of encryption is provided, reading out and decrypting the encrypted data stored in the nonvolatile storage device; and an encryption key managing section for, in response to an encryption key allocation request, which is supplied from outside the data storage apparatus, providing an encryption key generation request to the encryption key generating section and returning to the outside encryption key information determined by the encryption key managing section and which corresponds to the encryption key generated in response to the encryption key generation request, without returning to the outside the encryption key itself; for storing the encryption key and the corresponding encryption key information in the volatile encryption key storing device; for, in response to enctption key information and an instruction to encrypt data, reading out from the encryption key storing device the encryption key corresponding to the encryption key information and providing the read-out encryption key to the encryptor; and for, in response to encryption key information and an instruction to read out encrypted data, reading out from the encryption key storing device the encryption key corresponding to the encryption key information and providing the read-out encryption key to the decryptor.

14. The data storage apparatus according to claim 13, wherein the encryption key generator comprises a pseudorandom number generator.

15. The data storage apparatus according to claim 14, wherein the pseudorandom number generator is further responsive to signals from a timer.

16. The data storage apparatus according to claim 13, wherein the encryption key information comprises an encryption key number.

17. The data storage apparatus according to claim 13, wherein the encryptor logically combines the read-out encryption key and the data.

18. The data storage apparatus according to claim 13, wherein the decryptor logically combines the read-out encryption data and the encrypted data.

19. The data storage apparatus according to claim 13, wherein the volatile encryption key storing device stores multiple encryption keys, each of the multiple encryption keys being used for encrypting a different kind of data.

20. The data storage apparatus according to claim 13, wherein the encryption key managing section invalidates one of the encryption keys in response to an invalidation instruction and the encryption key information for the one of the encryption keys.

21. The data storage apparatus according to claim 13, wherein the volatile encryption key storing device further stores time data signifying a validity time for one or more of the encryption keys.

22. The data storage apparatus according to claim 13, further comprising selection circuitry operable to selectively bypass one or both of the encryptor and the decryptor.

* * * * *